United States Patent [19]
Fredrickson

[11] 4,434,504
[45] Feb. 28, 1984

[54] CHANNELING AND DECODE CIRCUIT FOR AIRBORNE RADIO-TELEPHONE SYSTEMS

[75] Inventor: Dennis L. Fredrickson, Leawood, Kans.

[73] Assignee: Frederickson Communications, Inc., Lenexa, Kans.

[21] Appl. No.: 387,234

[22] Filed: Jun. 10, 1982

[51] Int. Cl.³ .......................... H04B 1/00; H04B 7/00; H04Q 7/00
[52] U.S. Cl. ........................................ 455/32; 455/34; 455/35; 455/38; 455/77; 455/166; 340/825.13; 340/825.52; 340/825.69; 340/825.65
[58] Field of Search .................................. 455/32–36, 455/38, 54, 77, 161, 165, 166, 228; 179/2 EB; 340/825.11–825.13, 825.44, 825.48, 825.65, 825.69, 825.52

[56] References Cited

U.S. PATENT DOCUMENTS

| | | | |
|---|---|---|---|
| 3,426,279 | 2/1969 | Berman | 455/32 |
| 3,535,636 | 10/1970 | Muilwijk | 455/32 |
| 3,840,811 | 10/1974 | Blouch | 455/32 |
| 3,859,475 | 1/1975 | Wulfsberg | |
| 3,919,646 | 11/1975 | Morgan | 455/166 |
| 3,961,261 | 6/1976 | Pflasterer | 455/165 |
| 4,155,040 | 5/1979 | Harmon et al. | 455/34 |

Primary Examiner—Jin F. Ng
Attorney, Agent, or Firm—Schmidt, Johnson, Hovey & Williams

[57] ABSTRACT

An airborne radio-telephone transceiver is provided having improved channeling and decode circuitry compatible with the selective signalling call-up system prescribed by the Federal Communications Commission. The decode circuitry includes a filter and detector dependent only on reception of a single selected frequency transmitted as a call-up signal by a ground station. A retriggerable, resettable, monostable multivibrator, configured as a pulse swallower, provides the necessary counter offset for proper call-up signal decoding. The invention includes scanning circuitry for rapid operator selection of active transmit-receive channels in the operator's geographic area.

8 Claims, 2 Drawing Figures

CHANNELING AND DECODE CIRCUIT FOR AIRBORNE RADIO-TELEPHONE SYSTEMS

BACKGROUND OF THE INVENTION

1. Field of the Invention

This invention relates to radio-telephone systems, and especially to radio-telephone systems designed for communications between land based and airborne stations. In particular, the invention relates to the channeling and decode circuitry for airborne radio-telephone systems compatible with the selective signalling system prescribed in Sections 22.522 and 22.523 of the Federal Communications Commission Regulations.

2. Description of the Prior Art

The Federal Communications Commission (FCC) has established a nationwide plan for assignment of frequencies to land based stations rendering radio-telephone communications service to airborne stations. The FCC has also prescribed a frequency modulated selective signalling code for individual call-up of airborne stations. Airborne radio-telephone transceivers must be designed to be compatible with the FCC regulations.

The nationwide radio-telephone system for air-to-ground communications includes approximately 100 land based stations, which are interconnected to the nationwide public land line message telephone system and are capable of two-way radio communication with airborne stations. Twelve frequency pairs in the 450 to 460 MHZ range have been designated by the FCC as working channel numbers 1-12 for radio communications between land based stations and airborne stations. Each land based station is assigned one or more working channels, and interference between land stations is reduced or eliminated by assigning like channel numbers only to geographically spaced apart base stations. A common thirteenth channel at 454.675 MHZ is assigned to each base station and is used exclusively as a signalling channel for call-up of airborne stations.

Ground-to-air communications are initiated by selection of a base station in geographical proximity to the estimated position of the aircraft to be called. Each aircraft having an airborne radio-telephone system is assigned an individual five digit call-up number. The base station transmits the five digit number, along with its working channel designation, in pulse coded format on the signalling channel. The signalling channel is continuously monitored by airborne transceivers, and when the correct five digit identification number is decoded by a transceiver, the airborne radio telephone automatically switches to the initiating base station's working channel. An alarm or other display is activated to notify the airborne station operator of the incoming call.

Air-to-ground communications are initiated by selection of a working channel, and transmission from the air station to the land based station on the selected channel. Each land based station continuously transmits a dial tone on its working channel or channels at a low power level to facilitate channel selection. The channel corresponding to the base station transmitting the clearest dial tone is selected by the airborne operator. The land based station shifts to full power transmission when an air station initiated call is received, and the land based station operator connects the airborne station into the land line telephone network.

Selective individual call-up of airborne stations is accomplished by means of a code prescribed by Section 22.522 of the FCC regulations. The code comprises a pulsed, non-return to zero (NRZ) signal modulated on the 454.675 MHZ signalling channel. The code uses frequency shifts between 600 HZ and 1500 HZ to represent numerical digits. The code is comprised of two segments of multiple frequency shifts, representing groups of digits, that embody the address code and working channel number code respectively. A clearing pulse comprising a single frequency shift preceeds the address code group and another follows the channel code group. The first clearing pulse is followed by an idle period of 0.66 to 1.4 seconds. The first segment of multiple frequency shifts follows the idle period and is used to indicate the five digits of an individual airborne station's address code. Succeeding frequency shifts representing a single digit are spaced 0.1 second apart, and interdigital spacing within the address sequence is indicated by time gaps of 0.3 to 0.5 seconds between the last frequency shift of one digit and the first frequency shift of the succeeding digit. The address designation sequence and channel designation sequence of the code are separated by an idle period of at least 1.0 second. The channel designation segment is comprised of two to thirteen frequency shifts spaced 0.1 second apart, representing channels 1 through 12 respectively. The second segment of multiple frequency shifts is followed by an idle period of 0.3 second after which the second clearing pulse comprising a single frequency shift is transmitted. It will be appreciated that a time isolated single frequency shift cannot be used within the address code or the channel designation, since a single frequency shift is reserved as the clearing pulse. In this regard, the transceiver must account for the first frequency shift in each group of multiple frequency shifts so as to count two frequency shifts as one, three shifts as two, etc.

To be compatible with the above-described code, an airborne radio-telephone transceiver must first be able to detect and count the frequency shifts in the received signal. The transceiver must then differentiate between the address designation segment and the channel designation segment, and must be able to differentiate between the frequency shift groups representing digits within the address designation sequence. The selective signalling code or "number" embodied in the code must be compared to the number assigned to the airborne station and the transceiver must have the capability to automatically shift to a code designated working channel upon a proper match of the signalling code and the airborne station's number. The transceiver must be designed to clear its counters to zero each time a time isolated frequency shift is received. The transceiver must also have the capability to select an active working channel when air-to-ground communications are initiated by the airborne station operator.

A circuit capable of accomplishing the above-described functions is disclosed in U.S. Pat. No. 3,859,475, for which I was a co-inventor. The transceiver disclosed in U.S. Pat. No. 3,589,574, however, is relatively bulky, has relatively high power requirements, is dependent on clear transmission and precise reception of both the 600 HZ and 1500 HZ tones, and provides a relatively cumbersome system for selecting a channel when initiating air-to-ground transmissions.

SUMMARY OF THE INVENTION

This invention achieves significant overall improvement in airborne transceivers for radio-telephone systems, especially with respect to the transceiver channeling and decode circuitry. The invention is primarily concerned with circuitry that provides for more reliable and efficient reception, decoding, and channeling of ratio signals compatible with the selective signalling system prescribed by the FCC for air-to-ground radiotelephone communications.

The channeling and decode circuitry of the present invention includes filter and detector circuitry responsive to only a selected single frequency of the call-up signal transmitted by a ground station. Counting circuitry is included that is responsive to the output of the filter and detector circuitry, for decoding the address and channel designated by the call-up code. The channeling circuitry of the present invention includes apparatus for scanning through each of the twelve working channels designated for air-to-ground radio-telephone communications by the FCC, and for automatically locking the transceiver on to any channel for which a base station transmitted dial tone is received.

In the preferred form of the invention, the decode circuitry includes a filter for passing only the 1500 HZ frequency of the call-up signal, a tone detector responsive to the 1500 HZ signal, and a comparator responsive to the output of the tone detector for providing a square wave pulse. The counting circuitry includes a retriggerable, resettable, monostable multivibrator configured as a pulse swallower, and a series of one shot multivibrators. The one shot multivibrators provide logic timing sequences, and are instrumental in resetting the counting circuitry when a time isolated single frequency shift is detected by the transceiver. The pulse swallower properly accounts for the first frequency shift in each group of multiple frequency shifts.

It will be appreciated that, since the transceiver of the present invention requires only detection of a single frequency for decoding of a call-up signal, ground based transmitters could be simplified by eliminating the circuitry required to produce two tones modulated on a single carrier wave, without affecting the reliability of the system.

DESCRIPTION OF THE PREFERRED EMBODIMENT

Figure 1:
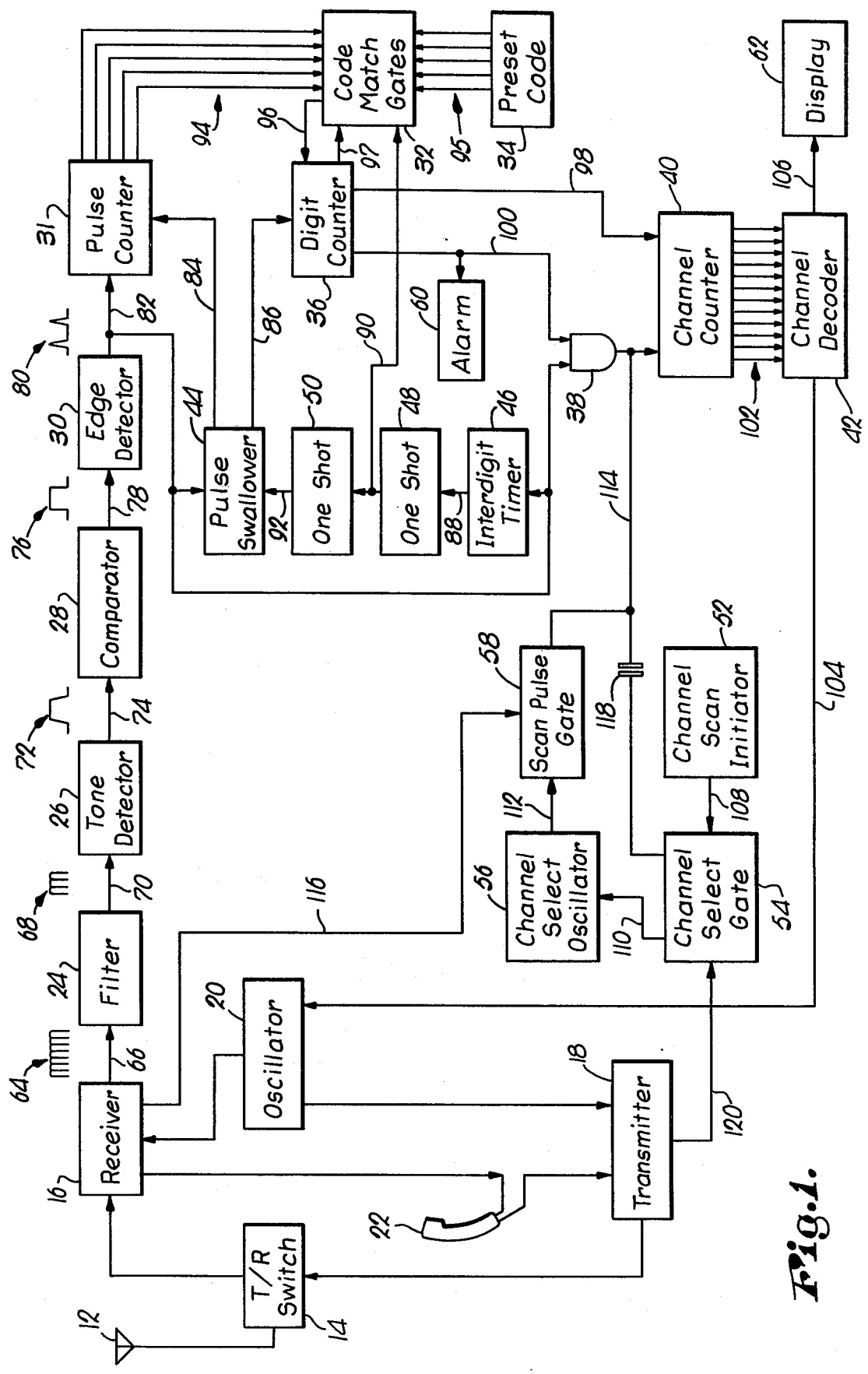
FIG. 1 is a block diagram of an air station transceiver, in accordance with the present invention, for air-to-ground radio-telephone communications.

Referring to the drawings, an airborne radio-telephone transceiver in accordance with the present invention is depicted in block diagram form in FIG. 1. The electrical signal paths for information flow between functional modules are shown in solid lines, expanded laterally when appropriate to indicate multi-conductor, parallel paths, and with arrowed heads to indicate directions of primary flow.

The transceiver 10 includes antenna 12, transmit-receive switch 14, receiver 16, transmitter 18, oscillator 20, and hand set 22, for the reception and transmission of frequency modulated radio signals in the 450 MHZ to 460 MHZ range. Circuitry for detecting frequency shifts modulated on received carrier waves includes a filter 24, a tone detector 26, a comparator 28, and an edge detector 30.

The transceiver circuitry provided for decoding a call-up signal includes pulse counter 31, code match gates 32, preset code matrix 34, digit counter 36, logic "and" gate 38, channel counter 40, nd channel decoder 42. A pulse swallower 44 eliminates the first frequency shift within each group of multiple frequency shifts, and a one shot multivibrator, functioning as interdigit timer 46, enables the counting circuitry to differentiate between individual digits within the address code designation segment of the call-up signal. One shot multivibrators 48 and 50 provide proper timing between signals within the counting circuitry.

The channel scan initiator 52, channel select gate 54, channel select oscillator 56, and scan pulse gate 58 function to set the transceiver 10 to operate on an active working channel when initiating air-to-ground communications. An alarm 60 and display 62 provide operator read out of the transceiver operational status.

The receiver 16 provides a rectified, frequency modulated output having a wave form as depicted at 64. The output of the receiver 16 is transmitted to the filter 24 via line 66. The filter 24 passes only the 1500 HZ component of the receiver 16 output. The output of filter 24 has a wave form as depicted at 68, and is transmitted to the tone detector 26 via line 70. The tone detector 26 provides a direct current output whose duration is measured by the duration of the 1500 HZ input to the tone detector 26. The output of the tone detector 26, depicted by wave form 72, is transmitted via line 74 to comparator 28. Comparator 28 has a square wave output depicted by wave form 76. The comparator output is transmitted to the edge detector 30 via line 78. The edge detector 30 provides a narrow pulsed output corresponding to each rising and falling edge of the square wave output of comparator 78. The output of the edge detector 30, depicted by wave form 80, is transmitted to the pulse counter 31, pulse swallower 44, interdigit timer 46, and gate 38 via line 82. The filter 24, tone detector 26, comparator 28, and edge detector 30 cooperatively function to provide a single, narrow pulsed output each time the receiver 16 detects a frequency shift from any frequency to 1500 HZ, or from 1500 HZ to any other frequency.

Pulse swallower 44 is a retriggerable, resettable, monostable, negative edge triggered multivibrator. The pulse swallower 44 provides an enabling output via line 84 to the pulse counter 31, and a digit advance output to the digit counter 36 via line 88, when triggered by the output of the edge detector. The pulse counter 31, will, therefore, not count the first pulsed output of edge detector 30 within a time grouped segment of narrow pulses 80, since the pulse counter 31 is not enabled by the pulse swallower 41 output until the trailing edge of the first pulse triggers the pulse swallower 44. Once enabled, the pulse counter 31 will count each of the remaining pulses of the edge detector output until the enabling output of the pulse swallower 44 is removed from the pulse counter 31 and the pulse counter 31 is thereby disabled.

Interdigit timer 46 is a one shot multivibrator having a holding time longer than 0.1 second and shorter than 0.3 second; that is, longer than the spacing between succeeding frequency shifts representing a single digit in the call-up code, and shorter than the time spacing between the address code segment and the channel code segment, and shorter than the time period between the clearing pulses and the channel and address pulses.

When the interdigit timer one shot 46 collapses, the negative edge of the timer's output triggers one shot multivibrator 48 via line 88. One shot multivibrator 48 has a short duration time, and functions solely at a time delay circuit. The output of the one shot 48 is transmitted as a strobe input to the code match gates 32 via line 90. When one shot 48 collapses, the negative edge of its output also triggers a second time delay one shot multivibrator 50. One shot multivibrator 50 has a short duration, and functions as a time delay circuit. The output of one shot 50 is transmitted to pulse swallower 44 via line 92. The pulse swallower 44 is disabled by the negative edge of the output of one shot 50, and the output of pulse swallower 44 is thereby removed from the pulse counter 31 and digit counter 36.

As a result of the above-described sequence of events, it will be appreciated that whenever a time interval of greater than 0.1 second occurs between frequency shifts in the transmitted call-up code, the code match gates 32 will receive a strobe pulse via line 90, and the pulse swallower 44 output to the pulse counter and the digit counter 36 via lines 84 and 86 respectively will be disabled. Once disabled, the pulse counter 31 resets to zero, and will not again be enabled to count the output pulses of edge detector 30 until the pulse swallower 44 is triggered by the negative edge of the next output pulse of the edge detector 30, and the enable output from the pulse swallower 44 is again provided to the pulse counter 31. It will also be appreciated that, since the output of pulse swallower 44 transmitted to the digit counter 36 via line 86 is disabled each time a time interval greater than 0.1 second occurs between succeeding frequency shifts, the digit counter 36 will receive a new count advance pulse each time a group of frequency shifts representing a digit is detected by the transceiver 10.

The output of the pulse counter 21 is transmitted to the code match gates 32 via parallel bus 94. Pulse counter 31 is a ten counter, and five of its available ten output states are connected to the code match gates 32 via the bus 94. The code match gates 32 compare the output of the pulse counter 30 with the hard wired address code transmitted to the gates 32 via bus 95 from the preset code matrix 34 each time a strobe pulse is received by the code match gates 32. Code match gates 32 receive a count input from digit counter 36 via line 97 to correctly match the individual lines of bus 94 with the corresponding lines of bus 97. A reset pulse from the code match gates 32 is transmitted to the digit counter 36 via line 96 whenever a mismatch between the pulse counter 31 output and preset code matrix 34 is detected by the gates 32. If the code match gates 32 detect a correct match, there is no output to the digit counter. As described above, code match gates 32 receive a strobe pulse after each group of frequency shifts representing a digit is received. The digit counter 36 will therefore reach state five only if all five digits in the address code are correctly matched by the code match gates 32 with the present code matrix 34.

The above-described circuit will inherently reset the digit counter 36 to zero whenever a single, time isolated frequency shift, representing a clearing pulse, is received by the transceiver 10. A time isolated frequency shift will produce a single narrow pulsed output from the edge detector 30 which is delivered via line 82 to pulse counter 31, pulse swallower 44, and interdigit timer 46. The pulse will have no effect on pulse counter 31 since pulse counter 31 is enabled only after the pulse swallower 44 transmits an enabling pulse via line 84 to the pulse counter 31. The negative edge of the single output of the edge detector 30 will trigger pulse swallower 44 and the interdigit timer 46. After a period of 0.1 second has elapsed, the interdigit timer 46 will collapse, one shot multivibrator 48 will be triggered, and code match gates 32 will receive a strobe pulse via line 90. Since there will at that time be no output to the code match gates 32 from the pulse counter 31 to be compared with the preset code matrix 34, a reset pulse will be transmitted from the code match gate 32 to the digit counter 36 via line 96, and the digit counter will reset to zero.

The digit counter 36 transmits a reset pulse to the channel counter 40 via line 98 when the digit counter 36 reaches state five. The channel designation sequence of the call-up code follows the five digit address designation sequence, after an idle period of at least one second. The channel designation sequence, comprising two to thirteen frequency shifts spaced 0.1 second apart, will provide an output of two to thirteen narrow pulses from the edge detector 30. The output of the edge detector 30 is again transmitted to the pulse counter 31, pulse swallower 44 and interdigit timer 46 via line 82. Line 82 also transmits the output of the edge detector 30 to "and" gate 28. The pulse swallower 44 is triggered by the negative edge of the first pulse in the channel designation sequence, and a digit counter advance signal is transmitted to the digit counter 36 via line 86, advancing digit counter 36 to state six. The state six output of digit counter 36 is transmitted to "and" gate 38, via line 100, enabling gate 38. Each output pulse from the edge detector 30 in the channel designation sequence following the first pulse in the channel designation sequence is thereby transmitted via line 82 through "and" gate 38 to the channel counter 40. In this manner, the channel counter 40 counts one less than the total number of channel designation sequence output pulses transmitted by the edge detector 30.

The output of channel counter 40 is transmitted to the channel decoder 42 via bus 102. The channel decoder 42 selects an individual crystal corresponding to the count of channel counter 40 and provides a frequency injection to oscillator 20 via line 104 such that the transceiver 10 is set up on the working channel designated by the call-up code. The channel decoder 42 transmits a signal via line 106 to display 62 indicating the decoded channel number.

Selection of a working channel, when using the transceiver 10 to call up a ground station, is accomplished by activating the channel scan initiator 52. Initiator 52 advantageously includes a push button (not shown) providing an output to the channel select gate 54 via line 108 so long as the push button is depressed. The output of the channel select gate 54 is transmitted to the channel select oscillator 56 via line 110. The channel select oscillator 56 is a multivibrator and generates an approximately 8 HZ pulse train for as long as the channel scan initiator 52 is activated. The output of the channel select oscillator 56 is transmitted via line 112, through scan pulse gate 58, and via line 114, to the channel counter 40. The channel counter 40 is thus stepped through each of its twelve counting states as long as the channel scan initiator 52 is activated and channel select gates 54 and scan pulse gate 58 are enabled. The channel decoder 42, in response to the output of the channel counter 40, steps the oscillator 20 through each of the twelve working channel frequencies. The receiver 16 provides an input from the receiver squelch control to the scan pulse gate 58 via line 116 when a dial tone, transmitted by a ground-based station, is detected by the receiver 16. The squelch control input to scan pulse gate 58 disables the gate, cutting off the output of channel select oscillator 56 to channel counter 40. Channel counter 40 is thus maintained in a steady state, and the transceiver 10 is set up on a single working channel when a dial tone is detected by the receiver 16.

The air station operator may desire to select a different channel than that first locked on to in the above-described manner. The operator may reinitiate scanning by first deactivating the channel scan initiator 52 and then reactivating the initiator 52. Reactivation of the initiator 52 transmits a pulse to channel counter 40 via line 114, capacitor 118, and channel select gate 54. The channel decoder 42 is thereby advanced to the next sequential channel, and scanning is resumed. Inadvertent scanning during transmit operations of the transceiver 10 is prohibited by an output from the transmitter 18 delivered to channel select gate 54 via line 120. The output from the transmitter 18 to the channel select gate 54 disables the gate 54, and thereby disables the scanning circuit.

Figure 2:
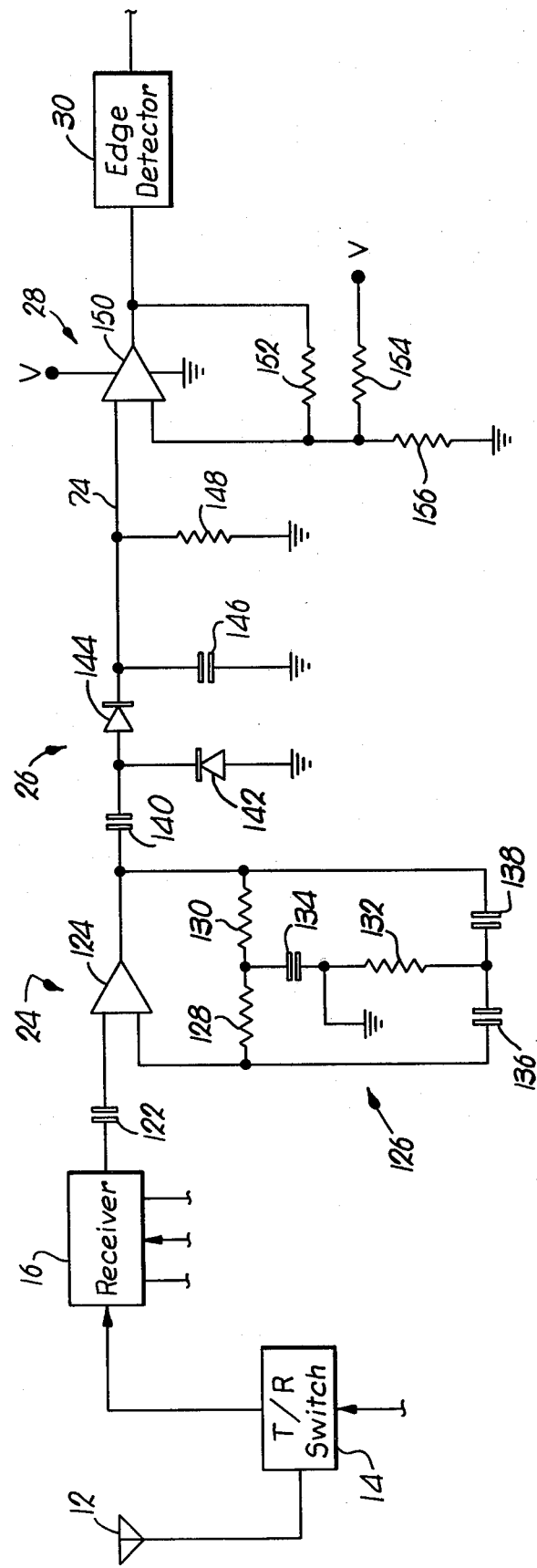
FIG. 2 is a schematic diagram of the filter, tone detector, and comparator circuitry of a transceiver in accordance with the present invention.

Referring to FIG. 2, the details of the filter 24, tone detector 26, and comparator 28 circuitry are shown in schematic form. The filter 24 is connected to the receiver 16 by coupling capacitor 122. Filter 24 includes an amplifier 124 having a frequency tuned feed-back loop 126. Feed-back loop 126 includes resistors 128, 130 and 132, and capacitors 134, 136, 138.

Tone detector 26 is connected to filter 24 by coupling capacitor 140. Tone detector 26 includes a voltage doubling diode 142, and a diode detector comprising diode 144, capacitor 146, and resistor 148.

The comparator 26 is connected to the tone detector 26 via line 74. Comparator 28 includes an amplifier 150 which is preferably a Schmitt trigger with hysterisis. The comparator 30 also includes feed-back resistor 152, and a voltage divider comprising resistors 154, 156. The comparator 28 compares the tone detector's output against a fixed reference voltage and provides an output depending on the presence or absence of a 1500 HZ modulating tone.

Having thus described an illustrative, preferred embodiment of my invention, what is claimed is as follows:

1. In an air-to-ground radio-telephone system having a ground-based transceiver adapted for transmitting to an airborne transceiver a calling signal in the nature of a sequence of pulses representing an address designation followed by a channel designation each encoded in accordance with a predetermined code, improved means in said airborne transceiver for detecting and decoding said address and channel designations comprising:

means for receiving said calling signal transmitted by said ground-based receiver;

frequency selective filter means coupled with said receiving means for passing only portions of said calling signal of substantially a single predetermined frequency;

detector means coupled with said filter means for providing an electrical output in the nature of pulses corresponding to occurence of only said portions of said calling signal of substantially said single frequency;

means for counting the leading and trailing edges of those of said pulses representing said address designation;

means for counting the leading and trailing edges of those of said pulses representing said channel designation for subsequent setting of said airborne transceiver to an operating channel identified by said channel designation;

means for comparing the count of said edges of said address designation with a preset address designation count representation maintained within said airborne transceiver for sensing the existence or absence of a match therebetween; and means for enabling said edge counting means for said channel designation only after the existence of a match between said edge count for said address designation and said preset address designation has been sensed.

2. The invention as set forth in claim 1, wherein said detector means comprises a tone detector responsive to said single frequency for generating a direct current electrical output, and a comparator operably coupled with said tone detector and responsive to said direct current electrical output for generating said pulsed output of said detector means.

3. In an air-to-ground radio-telephone system having a ground-based transceiver adapted for transmitting to an airborne transceiver a calling signal in the nature of a code having a sequence of pulses representing an address designation followed by a channel designation, said address designation being encoded as a plurality of groups of frequency shifts, said channel designation being encoded as a plurality of frequency shifts, improved means in said airborne transceiver for detecting and decoding said address and channel designations including:

means for detecting said address designating frequency shifts and said channel designating frequency shifts;

means for counting those of said frequency shifts representing said address designation;

means for counting those of said frequency shifts representing said channel designation for subsequent setting of said airborne transceiver to an operating channel identified by said channel designation;

means for comparing the count of said frequency shifts of said address designation with a preset address designation count representation maintained within said airborne transceiver for sensing the existence or absence of a match therebetween;

means for enabling said frequency shift counting means for said channel designation only after the existence of a match between said frequency shift count for said address designation and said preset address count designations has been sensed; and means for enabling said frequency shift counting means for said address designation and said frequency shift counting means for said channel designation by the first frequency shift in each of said groups, so that said address designation and said channel designation frequency shift counting means each count only those frequency shifts following said first frequency shift in each of said groups.

4. The invention as set forth in claim 3, said detecting means comprising:

means for receiving said calling signal transmitted by said ground based transceiver;

frequency selective filter means coupled with said receiving means for passing only portions of said calling signal of substantially a predetermined frequency; and detector means coupled with said filter means for providing an electrical output in the nature of pulses corresponding to occurence of only said portions of said calling signal of substantially said single frequency.

5. The invention as set forth in claim 4, said detector means comprising a tone detector responsive to said single frequency for generating a direct current electrical output, and a comparator operably coupled with said tone detector and responsive to said direct current electrical output for generating a square wave pulsed output.

6. The invention as set forth in claim 5, said comparator being a Schmitt trigger with hysterisis.

7. The invention as set forth in claim 3, said frequency shift counting means including a retriggerable, resettable, monostable multivibrator.

8. In an air-to-ground radio-telephone system having a ground-based transmitter adapted for transmitting to an airborne transceiver a calling signal on a calling channel and a continuous signal on one of a plurality of predetermined working channels, said calling signal being in the nature of a code having a sequence of pulses representing an address designation being encoded as a plurality of groups of frequency shifts, said channel designation being encoded as a plurality of frequency shifts, improved means in said airborne transceiver for detecting and decoding said address and channel designations and for monitoring said plurality of working channels for selectively setting said airborne transceiver to operate upon said one working channel for which said airborne transceiver is receiving said continuous signal from said ground-based transmitter including:

means for receiving said signals transmitted by said ground-based transceiver;

frequency selective filter means coupled with said receiving means for passing only portions of said calling signal of substantially a predetermined frequency;

detector means coupled with said filter means for providing an electrical output in the nature of pulses corresponding to occurence of only said portions of said calling signal of substantially said single frequency;

means for counting those of said frequency shifts representing said address designation;

means for counting those of said frequency shifts representing said channel designation for subsequent setting of said airborne transceiver to an operating channel identified by said channel designation;

means for comparing the count of said frequency shifts of said address designation with a preset address designation count representation maintained within said airborne transceiver for sensing the existence or absence of a match therebetween;

means for enabling said frequency shift counting means for said channel designation only after the existence of a match between said frequency shift count for said address designation and said preset address count designations has been sensed;

means for enabling said frequency shift counting means for said address designation and said frequency shift counting means for said channel designation by the first frequency shift in each of said groups, so that said address designation and said channel designation frequency shift counting means each count only those frequency shifts following said first frequency shift in each of said groups;

oscillator means for selectively generating an electrical output of any of a plurality of frequencies;

means for generating a continuous train of electrical pulses;

means operably coupled with said pulse generating means and said oscillator means and responsive to said pulses from said generating means for stepping said oscillator means through each of said plurality of frequencies successively;

means for receiving said signal from said ground-based transmitter upon whichever of said channels it is being transmitted, said receiving means being operably coupled with said oscillator means and responsive to said output from the latter for successive individual monitoring of each of said working channels, said receiving means including squelch control means; and means operably coupled with and responsive to said squelch control means for disabling said stepping means and thereby locking said oscillator means at a frequency corresponding to said one channel upon which said continuous signal is received by said receiving means from said ground-based transmitter.

* * * * *